(12) United States Patent
Latham, II et al.

(10) Patent No.: US 8,629,663 B2
(45) Date of Patent: Jan. 14, 2014

(54) SYSTEMS FOR INTEGRATED SWITCH-MODE DC-DC CONVERTERS FOR POWER SUPPLIES

(75) Inventors: Paul W. Latham, II, Lee, NH (US); Mansur B. Kiadeh, Cupertino, CA (US); Sudha Durvasula, Los Altos, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 60 days.

(21) Appl. No.: 13/078,283

(22) Filed: Apr. 1, 2011

(65) Prior Publication Data

US 2012/0249103 A1     Oct. 4, 2012

(51) Int. Cl.
    *G05F 1/577*     (2006.01)

(52) U.S. Cl.
    USPC .......................... 323/267; 323/223; 323/282

(58) Field of Classification Search
    USPC ......... 323/267, 222, 223, 224, 225, 299, 271, 323/282, 284; 307/43, 75
    See application file for complete search history.

(56) References Cited

U.S. PATENT DOCUMENTS

| | | | |
|---|---|---|---|
| 5,526,252 A * | 6/1996 | Erdman | 363/41 |
| 6,489,732 B2 * | 12/2002 | Ito et al. | 315/308 |
| 6,984,965 B2 * | 1/2006 | Vinciarelli | 323/266 |
| 7,372,239 B2 * | 5/2008 | Kumagai et al. | 323/267 |
| 7,425,941 B2 * | 9/2008 | Sung et al. | 345/98 |
| 7,538,535 B2 * | 5/2009 | McDonald et al. | 323/288 |
| 7,542,311 B2 * | 6/2009 | Serpa et al. | 363/40 |
| 7,679,350 B2 * | 3/2010 | Falvey et al. | 323/284 |
| 2002/0008499 A1 * | 1/2002 | Henry | 323/267 |
| 2008/0084197 A1 * | 4/2008 | Williams et al. | 323/282 |
| 2009/0033308 A1 * | 2/2009 | Narendra et al. | 323/299 |
| 2009/0057299 A1 * | 3/2009 | Pastore et al. | 219/626 |
| 2010/0026267 A1 * | 2/2010 | Easwaran et al. | 323/288 |
| 2011/0089917 A1 * | 4/2011 | Chen et al. | 323/282 |

\* cited by examiner

*Primary Examiner* — Matthew Nguyen
*Assistant Examiner* — Alex Torres-Rivera

(57) ABSTRACT

A first control system for a power supply includes a switch-mode DC-DC converter module and an FET gate drive module. The switch-mode DC-DC converter module receives an input voltage and generates first and second voltages, the first voltage powering a DC-DC control module. The FET gate drive module selectively drives a plurality of FETs of the power supply using the second voltage thereby generating a desired output voltage from the input voltage. A second control system is directed to driving the second voltage to a desired gate voltage, wherein the desire gate voltage is determined based on at least one of a plurality of operating parameters. A third control system includes controlling first and second voltages generated by a SIDO voltage converter based on the first and second voltages and a damping factor, and generating the damping factor based on current flowing through the inductor of the SIDO voltage converter.

10 Claims, 14 Drawing Sheets

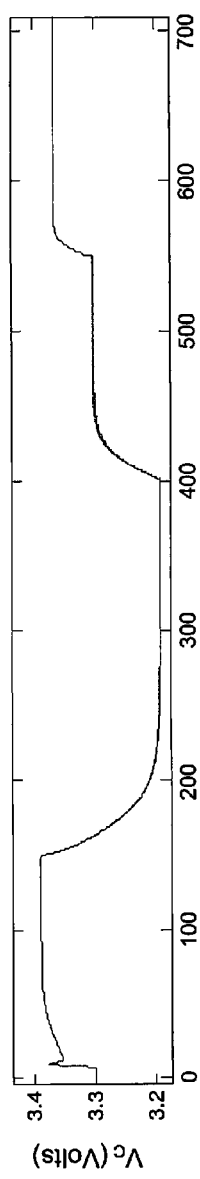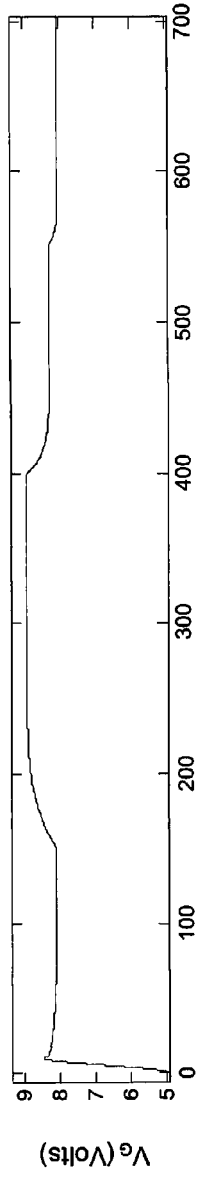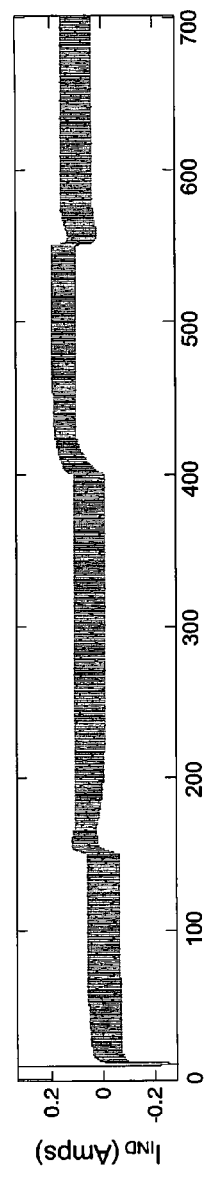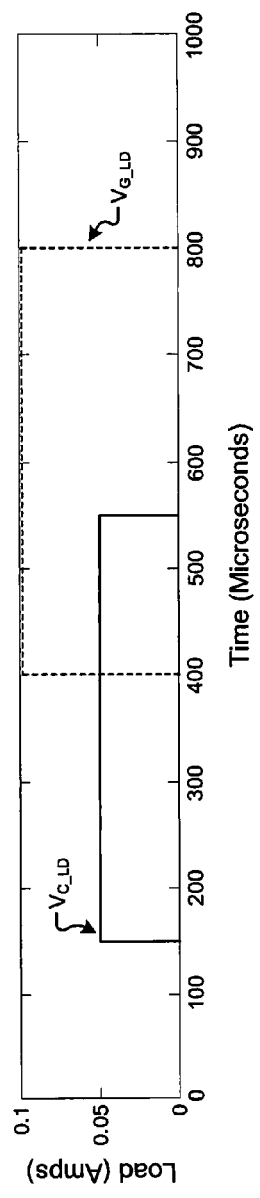
FIG. 7A
FIG. 7B
FIG. 7C
FIG. 7D

SYSTEMS FOR INTEGRATED SWITCH-MODE DC-DC CONVERTERS FOR POWER SUPPLIES

FIELD

The present disclosure relates to power supplies and more particularly to systems and methods for integrated switch-mode direct current (DC) to DC converters for power supplies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply receives an input voltage and generates an output voltage that may be used to power one or more components. For example, the output voltage may power one or more components of an integrated circuit (IC). The output voltage may be generated by manipulating the input voltage. For example, a controller may control switching of field effect transistors (FETs) to generate the output voltage using the input voltage. In addition, the input voltage may be used to power the controller and the FETs. The voltages required to operate the controller and the FETs may be less than the input voltage. In addition, the controller and the FETs may require different voltages to operate.

SUMMARY

A first control system for a power supply includes a switch-mode direct-current (DC) to DC converter module and a field effect transistor (FET) gate drive module. The switch-mode DC-DC converter module receives an input voltage and generates first and second voltages, wherein the first voltage powers a DC-DC control module. The FET gate drive module selectively drives a plurality of FETs of the power supply using the second voltage thereby generating a desired output voltage from the input voltage.

A second control system for a power supply includes a voltage converter module and an FET gate drive module. The voltage converter module receives an input voltage and that generates first and second voltages, wherein the first voltage powers a DC-DC control module. The FET gate drive module selectively drives a plurality of FETs of the power supply using a desired gate voltage thereby generating a desired output voltage from the input voltage, wherein the FET gate drive module drives the second voltage to the desired gate voltage, and wherein the FET gate drive module determines the desired gate voltage based on at least one of a plurality of operating parameters.

A third control system for a power supply includes first and second modules. The first module controls first and second voltages generated by a single-inductor dual-output (SIDO) voltage converter based on the first and second voltages and a damping factor. The second module generates the damping factor based on current flowing through the inductor of the SIDO voltage converter.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7A-7D are graphs illustrating simulated responses of control voltage, gate voltage, and inductor current to various control voltage and gate voltage load steps according to one implementation of the present disclosure.

DETAILED DESCRIPTION

Figure 1:
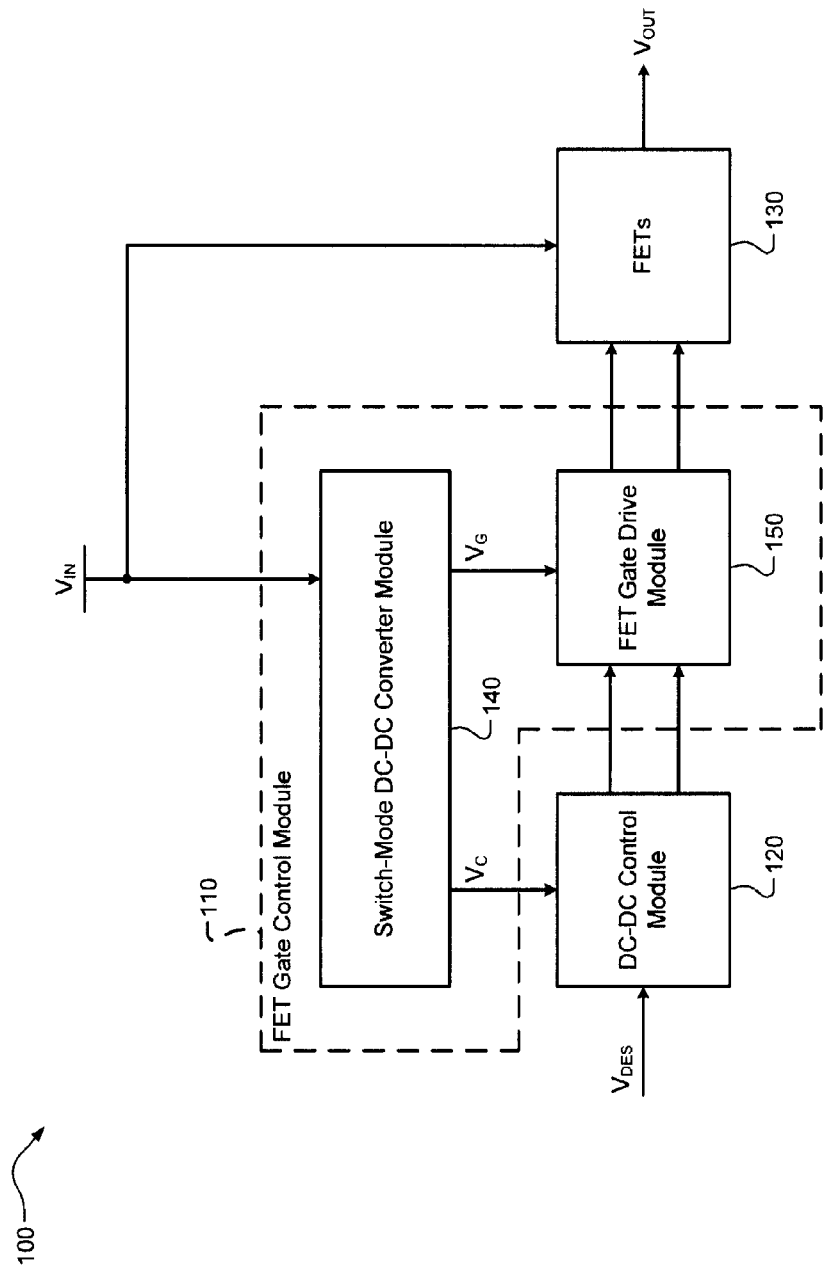
FIG. 1 is a functional block diagram of an example control system for a power supply according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to as a whole, or be part of, or include a general purpose integrated circuit (IC); an Application Specific Integrated Circuit (ASIC); a plurality of ICs; an electronic circuit; a combinational logic circuit; a field programmable gate array (FPGA); a processor (shared, dedicated, or group) that executes code; other suitable components that provide the described functionality; or a combination of some or all of the above, such as in a system-onchip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As previously described, an input voltage for a power supply may be used to power both a controller and corresponding field effect transistors (FETs). The voltages required by the controller and the FETs, however, may be less than the input voltage. In addition, the voltages required by the controller and the FETs, respectively, may be different. Conventional control systems, therefore, may generate these lower voltages from the input voltage using two linear regulators or low-dropout (LDO) regulators, respectively (collectively referred to as LDO regulators). LDO regulators, however, are inefficient and may suffer from large power losses. In addition, the voltage required by the FETs may vary based on an output load.

Accordingly, systems and methods are presented for an integrated switch-mode DC-DC converter for power supplies. A first system is directed to integrated packaging of an FET gate control module. Specifically, the FET gate control module may include both a switch-mode DC-DC converter module and an FET gate drive module. The switch-mode DC-DC converter module may be a single-inductor dual-output (SIDO) voltage converter or a dual-output charge pump. The switch-mode DC-DC converter module may also include other suitable switch-mode devices such as single-inductor single-output (SISO) voltage converters, buck converters with integrated inductors, boost converters with integrated inductors, single-output voltage converters, etc. Therefore, depending on the switch-mode DC-DC converter module configuration, inductors and/or capacitors may be either integrated internally or externally connected by a user. The system also has flexibility. More specifically, combinations of various single-output devices may be implemented as well as combinations of single-output devices and existing LDOs or other linear regulators.

In addition, according to another example of the present disclosure, when one of the voltages is bucked (i.e., stepped-down), the other voltage may be boosted (i.e., stepped-up). Therefore, the system is capable of operating using a lower input voltage. More specifically, the gate voltage may be boosted to a required gate voltage greater than the input voltage (while the control voltage is bucked). The capability to run at a lower input voltage may further decrease power consumption. In addition, this configuration may be well-suited for small, mobile applications.

The integrated FET gate control module may operate as follows. First, the integrated FET gate control module is supplied with an input voltage. For example only, the input voltage may be between 7 and 12 volts (V). The input voltage, however, may be another suitable voltage. The switch-mode DC-DC converter module generates first and second voltages from the input voltage. The first voltage is supplied to a DC-DC control module for the power supply and therefore may be referred to as a control voltage ($V_C$). For example, the control voltage $V_C$ may be approximately 3.3 V. The DC-DC control module controls the FET gate drive module (e.g., a pulse-width modulator, or PWM duty cycle). The second voltage is supplied to the FET gate drive module and therefore may be referred to as a gate voltage ($V_G$). For example, the gate voltage may be between 5 V and 8.5 V. The FET gate drive module selectively drives one or more of a plurality of external FETs using the gate voltage. The switching of the FETs controls a voltage output by the power supply.

A second system and a method are directed to controlling voltages output by an SIDO voltage converter. The control system and method may adjust the output voltages of the SIDO voltage converter based on the output voltages and a damping factor based on a current flowing through the inductor of the SIDO voltage converter. The control system and method, therefore, are capable of controlling both output voltages while maintaining cross-regulation between the output voltages within an acceptable range. For example only, the acceptable range may be less than 10%. Moreover, the control system and method include one compensator loop for both output voltages compared to a conventional configuration of one compensator per output. A single compensator loop simplifies the control system and method compared to conventional control systems and methods. For example, the single compensator loop may be both less complex and may have a fixed gain.

Referring now to FIG. 1, an example control system 100 for a power supply is shown. The control system 100 includes an integrated FET gate control module 110, a DC-DC control module 120, and a plurality of FETs 130. For example only, the FET gate control module 110 and the DC-DC control module 120 may be integrated on a single silicon die. The integrated FET gate control module 110 includes both a switch-mode DC-DC converter module 140 and an FET gate drive module 150.

The integrated FET gate control module 110 may include both the switch-mode DC-DC converter module 140 and the FET gate drive module 150 integrated on a single silicon die. The switch-mode DC-DC converter module 140 and the FET gate drive module 150, however, may also be separate components (i.e., different silicon dies) that are then connected together in a single integrated circuit (IC) package. Depending on the configuration of the switch-mode DC-DC converter module 140, the integrated FET gate control module 110 may have additional components either integrated or externally connected by a user. For example, one or more inductors may be integrated or externally connected when the switch-mode DC-DC converter module 140 is an SIDO voltage converter. Alternatively, for example, one or more capacitors may be integrated or externally connected when the switch-mode DC-DC converter module 140 is a dual-output charge pump. The number of inductors or capacitors may vary depending on input and output voltage requirements.

The switch-mode DC-DC converter module 140 generates first and second voltages from the input voltage $V_{IN}$ (hereinafter referred to as control voltage $V_C$ and gate voltage $V_G$, respectively). The control voltage $V_C$ powers the DC-DC control module 120. For example only, the control voltage $V_C$ may be approximately 3.3V. The gate voltage $V_G$ is used to drive the FETs 130. For example only, the gate voltage $V_G$ may be between 5.0V and 8.5V. However, other magnitudes for the control voltage $V_C$ and the gate voltage $V_G$ may be used depending on an implementation.

The DC-DC control module 120 controls a duty cycle of the FET gate control module 110 based on a desired output voltage $V_{DES}$ and the input voltage $V_{IN}$. Specifically, the DC-DC control module 120 may generate a control signal for a PWM module 202 (see FIGS. 2A-2D) in the FET gate drive module 150. The FET gate drive module 150 may then selectively drive one or more of the plurality of FETs 130 using the gate voltage $V_G$ and according to the control signal (i.e., the desired duty cycle). The switching of the FETs 130 alternates between charging/discharging an inductor-capacitor (LC) circuit of the power supply to generate the desired output voltage $V_{DES}$ from the input voltage $V_{IN}$.

Figure 2A:
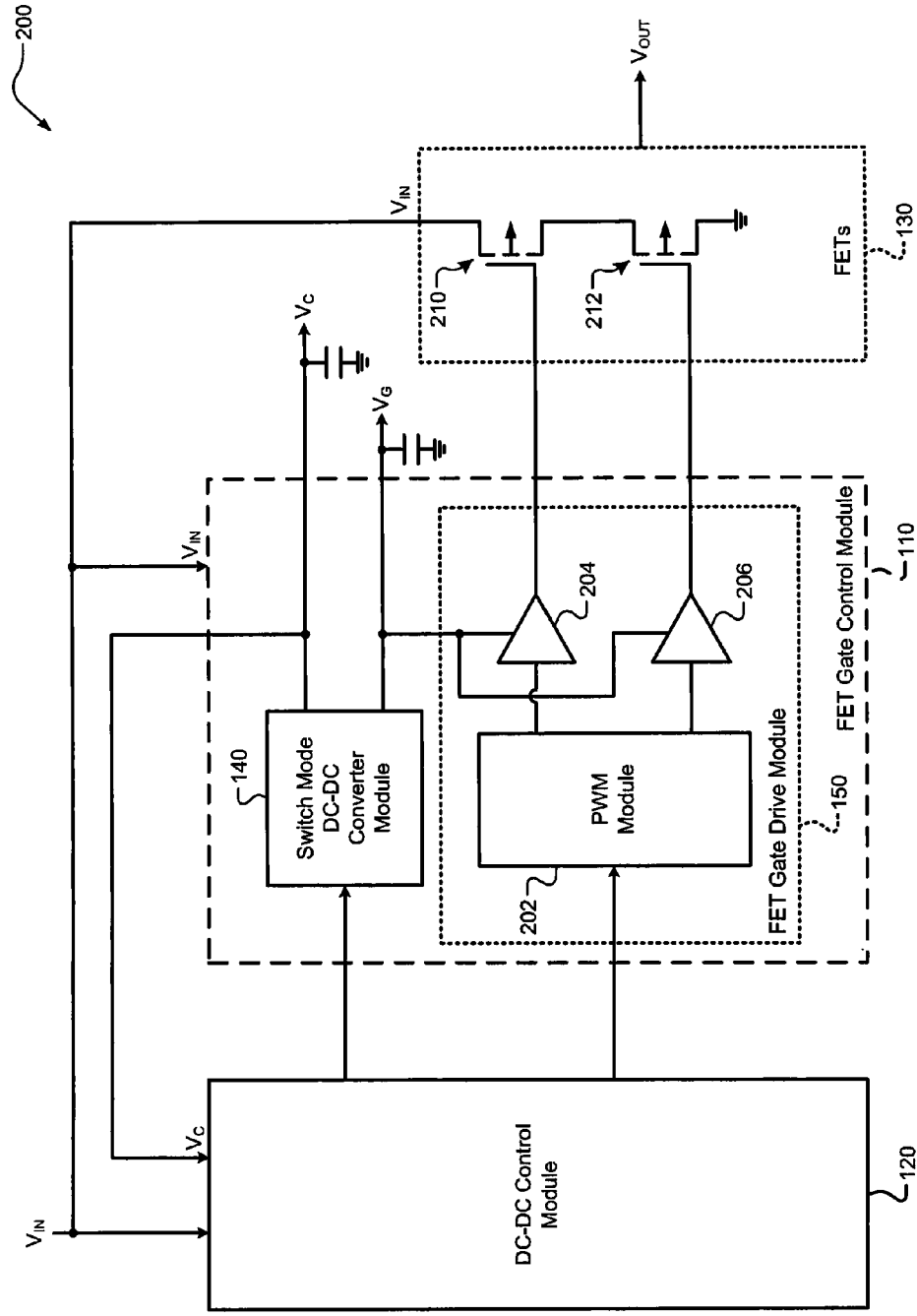
FIG. 2A is a schematic of an example control system for a power supply according to one implementation of the present disclosure.

Referring now to FIG. 2A, another example of control system 200 for a power supply is shown. The switch-mode DC-DC converter module 140 generates the control voltage $V_C$ and the gate voltage $V_G$ from the input voltage $V_{IN}$. The switch-mode DC-DC converter module 140 may also receive a control signal from the DC-DC control module 120 indicating a desired gate voltage $V_{GDES}$ (described in more detail later). The FET gate drive module 150 further includes a PWM module 202 and first and second amplifiers 204, 206 for driving first and second ones of the FETs 130 (210 and 212, respectively). The PWM module 202 receives a control signal from the DC-DC control module 120 indicating a desired duty cycle. The PWM module 202 may then control driving the first and second amplifiers 204, 206 using the gate voltage $V_G$ based on the desired duty cycle.

Figure 2B:
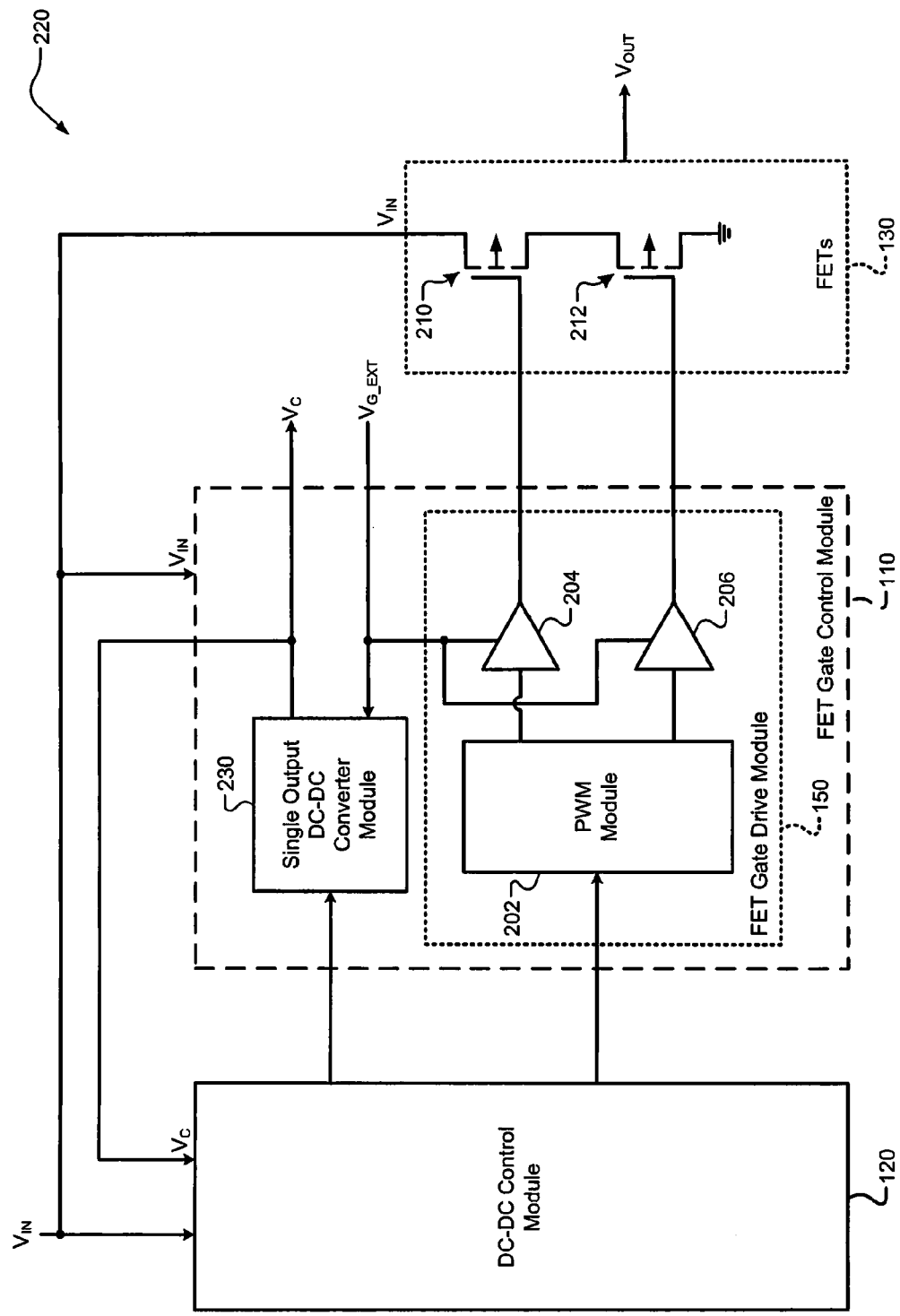
FIGS. 2B-2D are schematics of example control systems for a power supply according to other implementations of the present disclosure.
Figure 2C:
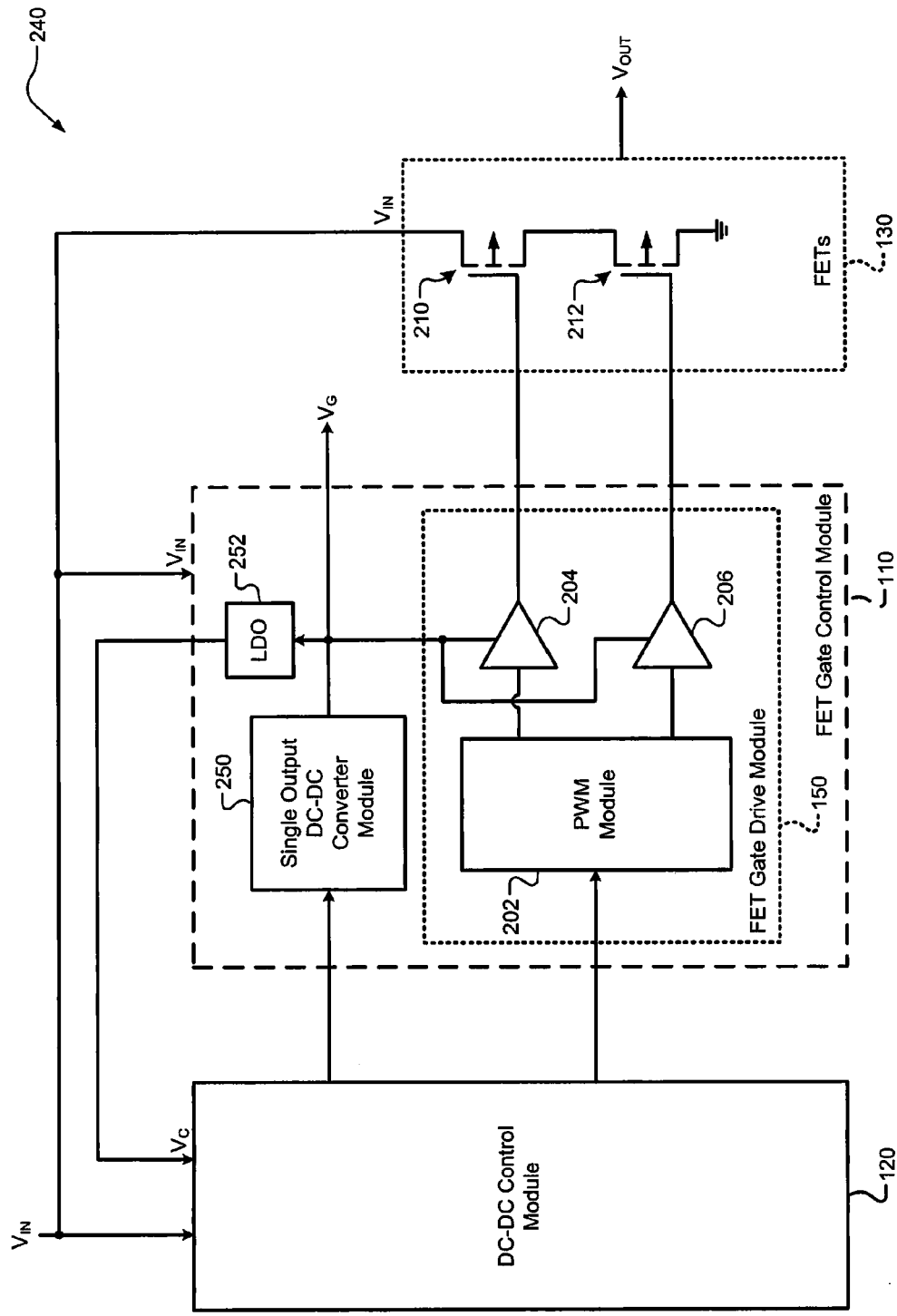
Figure 2D:
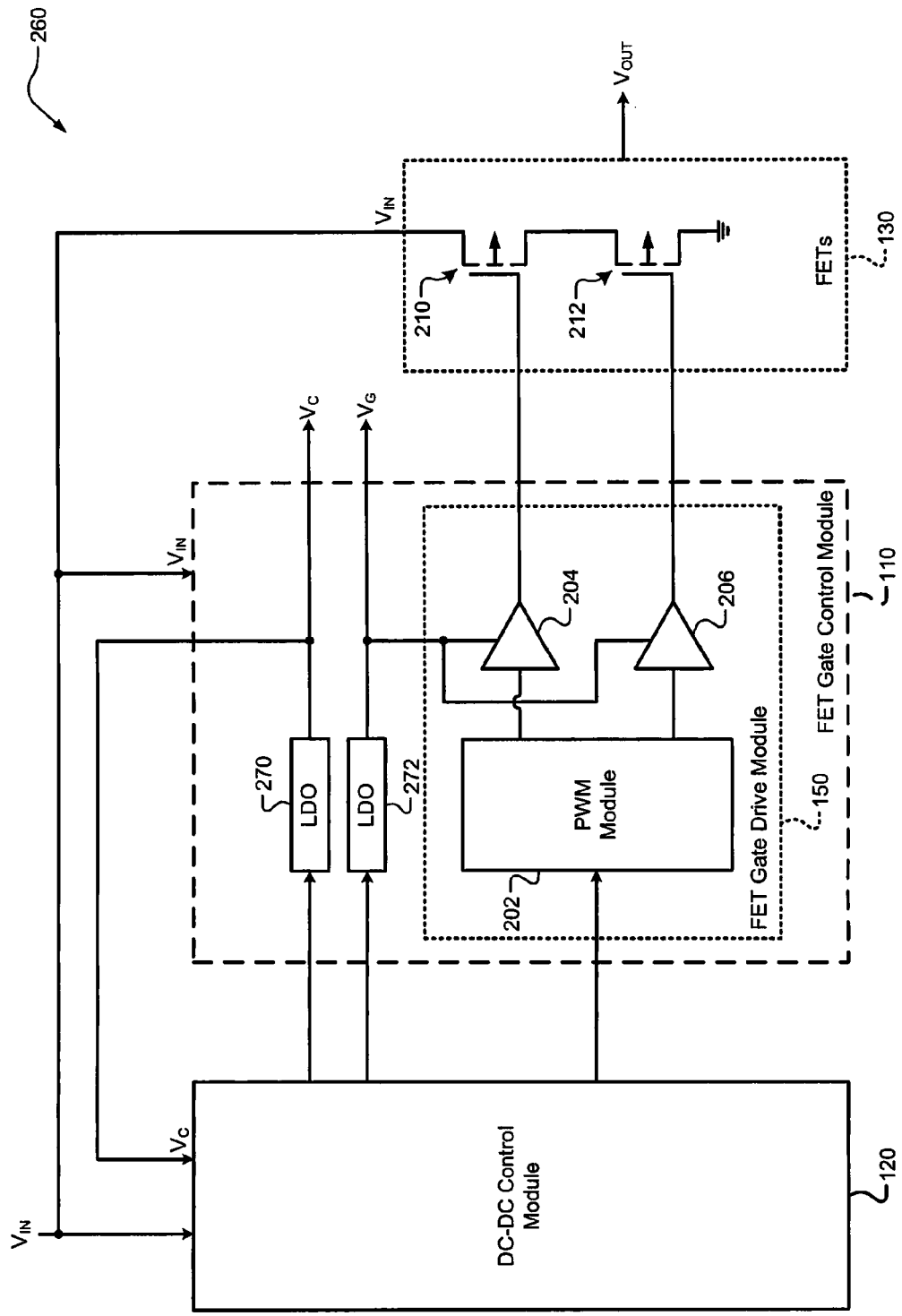

The control system according to the present disclosure, however, has flexibility. For example, FIGS. 2B-2D illustrate alternative example control systems for a power supply. FIG. 2B illustrates an external gate voltage ($V_{G\_EXT}$) being supplied to the FET gate control module 110. For example, the external gate voltage $V_{G\_EXT}$ may be connected to the FET gate control module 110 by a user. Therefore, a single-output DC-DC converter module 230 may be implemented. The single-output DC-DC converter module 230 may generate the control voltage $V_C$ from the input voltage.

FIGS. 2C and 2D, on the other hand, illustrate usage of existing (i.e., already implemented) LDOs. Specifically, FIG. 2C illustrates a single-output DC-DC converter module 250 in addition to an LDO 252. The single-output DC-DC converter module 250 generates the gate voltage $V_G$ from the input voltage $V_{IN}$. The LDO 252, on the other hand, generates the control voltage $V_C$ from the gate voltage $V_G$. Alternatively, however, the LDO 252 may generate the control voltage $V_C$ from the input voltage $V_{IN}$. Similarly, FIG. 2D illustrates two LDOs 270 and 272 used to generate the control voltage $V_C$ and the gate voltage $V_G$, respectively, from the input voltage $V_{IN}$.

Figure 3A:
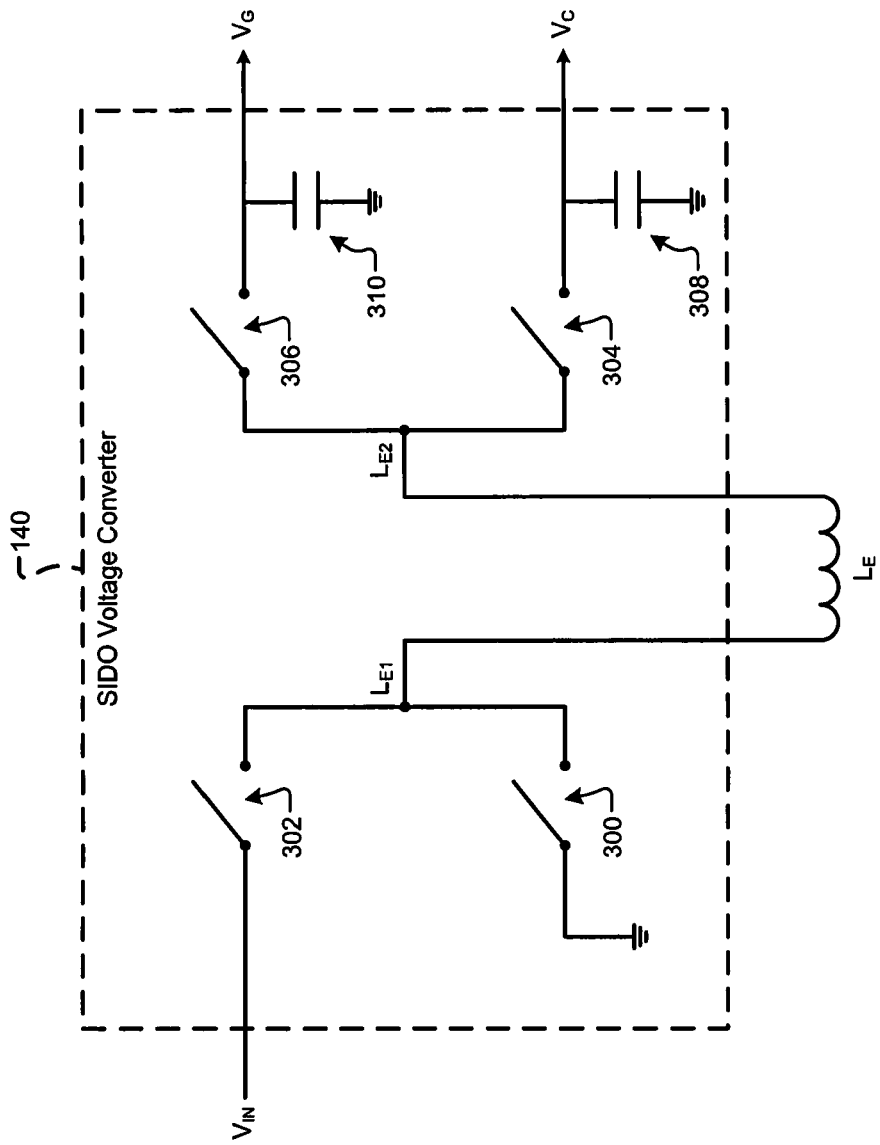
FIG. 3A is a schematic of a single-inductor dual-output (SIDO) voltage converter according to one implementation of the present disclosure.

Referring now to FIG. 3A, an example of the switch-mode DC-DC converter module 140 is shown. Specifically, FIG. 3A illustrates an SIDO voltage converter 140 that generates both the control voltage $V_C$ and the gate voltage $V_G$ from the input voltage $V_{IN}$. The SIDO voltage converter 140 may include switches 300, 302, 304, and 306 and capacitors 308 and 310. For example, the switches 300, 302, 304, and 306 may be FETs. The switches 300, 302, 304, and 306 may be actuated by an external controller or an internal controller (not shown). Controlling the switches 300, 302, 304, 306 provides for control of the control voltage $V_C$ and the gate voltage $V_G$.

An external inductor $L_E$ is connected between the pairs of switches 300, 302, 304, 306 at first and second nodes ($L_{E1}$ and $L_{E2}$, respectively). While an external inductor $L_E$ is shown, the inductor $L_E$ could also be integrated. A current sensor (not shown) may also measure the current $I_{IND}$ flowing through the inductor $L_E$. A first node of switch 300 is connected to ground (GND). A second node of switch 300 is connected to node $L_{E1}$ and switch 302. Switch 300 selectively connects ground GND to discharge the inductor $L_E$. A first node of switch 302 is connected to the input voltage $V_{IN}$. A second node of switch 302 is connected to node $L_{E1}$ and switch 300. Switch 302 selectively connects $V_{IN}$ to charge the inductor $L_E$.

A first node of switch 304 is connected to node LE2. A second node of switch 304 is connected to capacitor 308 and the control voltage $V_C$ output. Switch 304 selectively discharges the inductor $L_E$ to charge the capacitor 308. The voltage at capacitor 308 is then output as the control voltage $V_C$. A first node of switch 306 is connected to node $L_{E2}$. A second node of switch 306 is connected to capacitor 310 and the gate voltage $V_G$ output. Switch 306 selectively discharges the inductor $L_E$ to charge the capacitor 310. The voltage at capacitor 310 is then output as the gate voltage $V_G$.

Figure 3B:
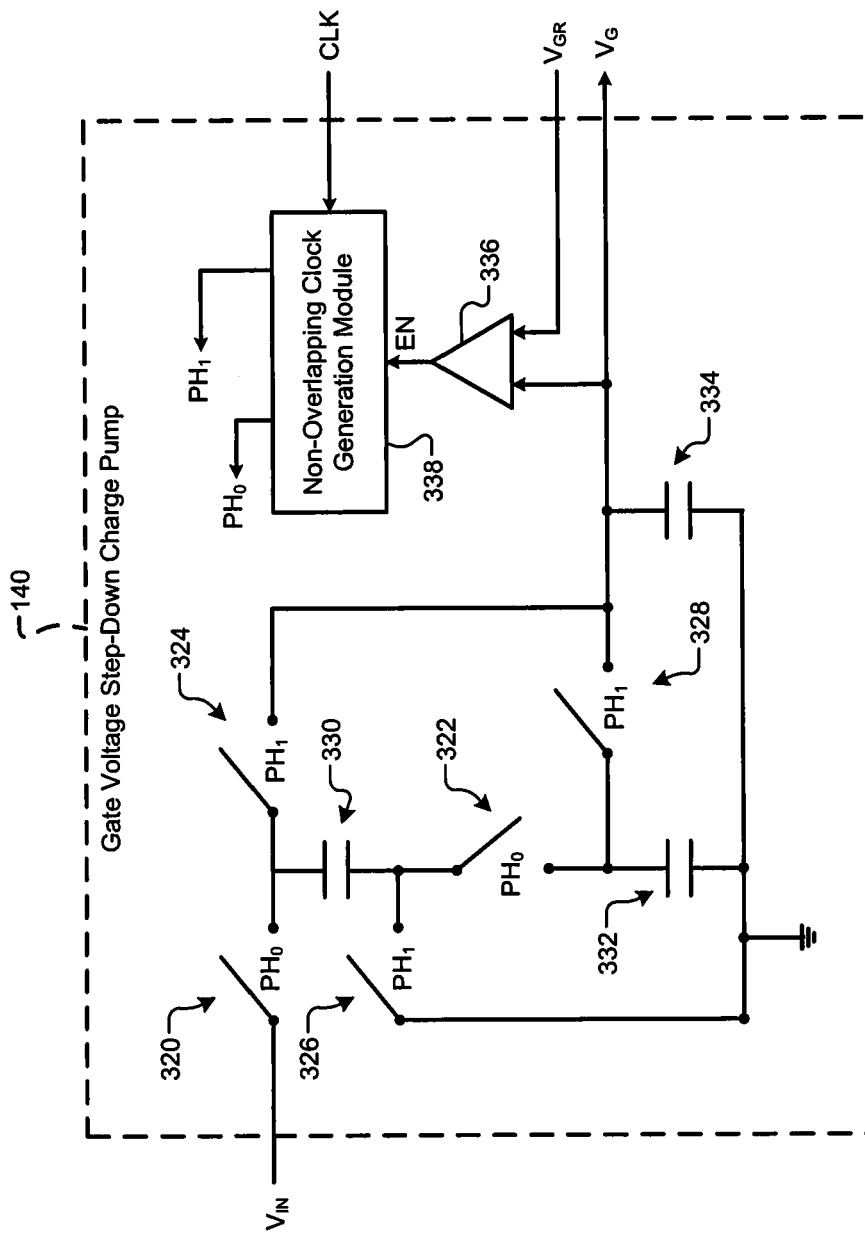
FIGS. 3B-3C are schematics of step-down charge pumps according to another implementation of the present disclosure.

Referring now to FIG. 3B, another example of the switch-mode DC-DC converter module 140 is shown. Specifically, FIG. 3B illustrates a step-down charge pump for the gate voltage $V_G$. The gate voltage step-down charge pump 140 may include a first set of switches 320 and 322 and a second set of switches 324, 326, and 328. The charge pump 140 further includes capacitors 330, 332, and 334. While integrated capacitors 330, 332, and 334 are shown, one or more of the capacitors 330, 332, and 334 may also be connected externally by a user. In addition, the charge pump 140 also includes a comparator 336 that selectively enables a non-overlapping clock generation module 338.

A first node of switch 320 is connected to the input voltage $V_{IN}$. A second node of switch 320 is connected to switch 324 and capacitor 330. A first node of switch 322 is connected to switch 326 and capacitor 330. A second node of switch 322 is connected to switch 328 and capacitor 332. A first node of switch 324 is connected to switch 320 and capacitor 330. A second node of switch 324 is connected to switch 328, capacitor 334, the comparator 336, and the gate voltage $V_G$ output. A first node of switch 326 is connected to switch 322 and capacitor 330. A second node of switch 326 is connected to capacitor 332, capacitor 334, and ground GND. A first node of switch 328 is connected to switch 322 and capacitor 332. A second node of switch 328 is connected to switch 324, capacitor 334, the comparator 336, and the gate voltage $V_G$ output.

The comparator 336 may selectively enable the non-overlapping clock generation module 338 (via enable signal EN) based on the gate voltage $V_G$ and a reference gate voltage ($V_{GR}$). When enabled, the non-overlapping clock generation module 338 may generate non-overlapping clock signals $PH_0$ and $PH_1$ based on a received reference clock signal (CLK). The first set of switches 320 and 322 are driven using clock signal $PH_0$ and the second set of switches 324, 326, and 328 are driven using clock signal $PH_1$. By controlling the clock signals $PH_0$ and $PH_1$, the capacitors 330, 332, and 334 may be charged by the input voltage $V_{IN}$ and the gate voltage $V_G$ is based on the capacitor voltages.

Figure 3C:
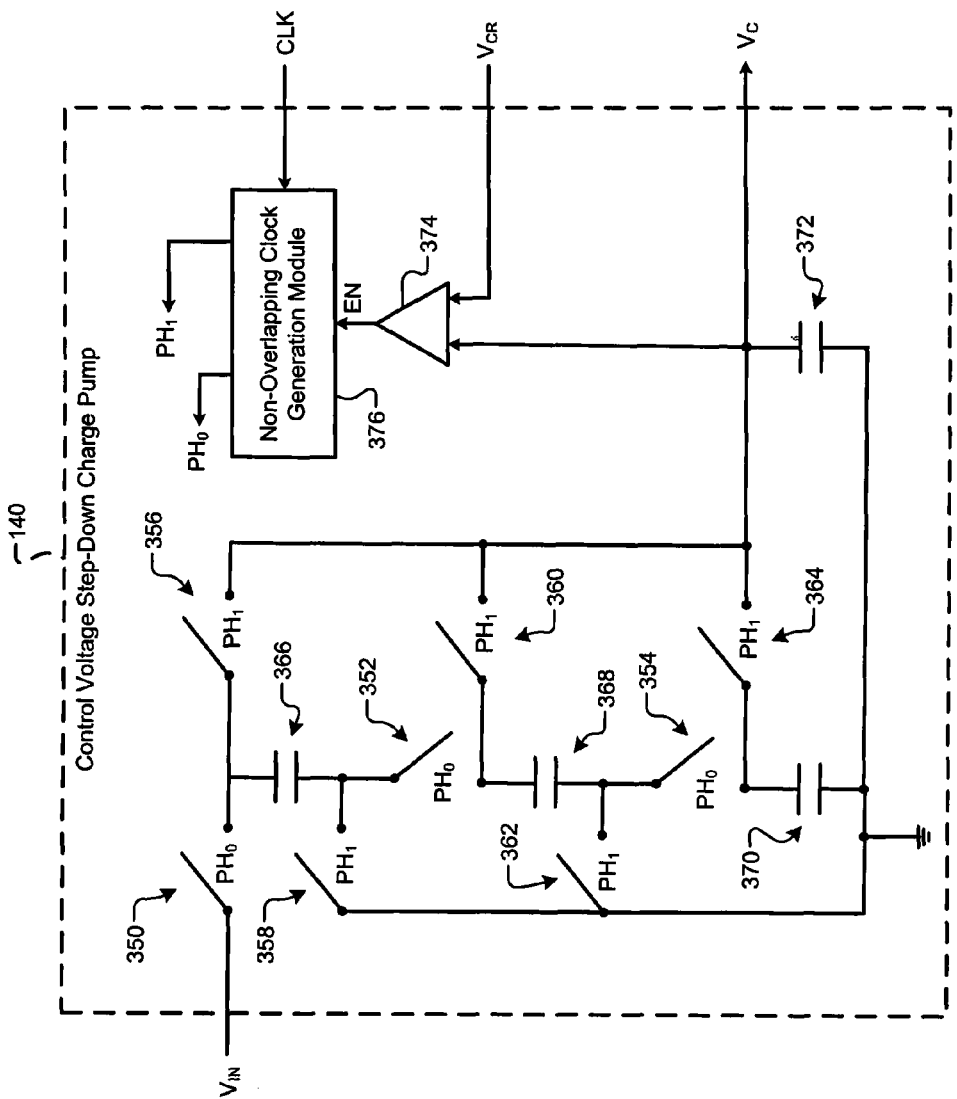

Referring now to FIG. 3C, another example of the switch-mode DC-DC converter module 140 is shown. Specifically, FIG. 3C illustrates a step-down charge pump for the control voltage $V_C$. The control voltage step-down charge pump 140 may include a first set of switches 350, 352, and 354 and a second set of switches 356, 358, 360, 362, and 364. The charge pump 140 further includes capacitors 366, 368, 370, and 372. While integrated capacitors 366, 368, 370, and 372 are shown, one or more of the capacitors 366, 368, 370, and 372 may also be connected externally by a user. In addition, the charge pump 140 also includes a comparator 374 that selectively enables a non-overlapping clock generation module 376.

A first node of switch 350 is connected to the input voltage $V_{IN}$. A second node of switch 350 is connected to switch 356 and capacitor 366. A first node of switch 352 is connected to switch 358 and capacitor 366. A second node of switch 352 is connected to switch 360 and capacitor 368. A first node of switch 354 is connected to switch 362 and capacitor 368. A second node of switch 354 is connected to switch 364 and capacitor 370. A first node of switch 356 is connected to switch 350 and capacitor 366. A second node of switch 356 is connected to switch 360, switch 364, capacitor 372, the comparator 374, and the control voltage $V_C$ output.

A first node of switch 358 is connected to switch 352 and capacitor 366. A second node of switch 358 is connected to switch 362. A first node of switch 360 is connected to switch 352 and capacitor 368. A second node of switch 360 is connected to switch 356, switch 364, capacitor 372, the comparator 374, and the control voltage $V_C$ output. A first node of switch 362 is connected to switch 358, capacitor 370, capacitor 372, and ground GND. A second node of switch 362 is connected to switch 354 and capacitor 368. A first node of switch 364 is connected to switch 354 and capacitor 370. A second node of switch 364 is connected to switch 356, switch 360, capacitor 372, the comparator 374, and the control voltage $V_C$ output.

The comparator 374 may selectively enable the non-overlapping clock generation module 376 (via enable signal EN) based on the control voltage $V_C$ and a reference control voltage ($V_{CR}$). When enabled, the non-overlapping clock generation module 376 may generate non-overlapping clock signals $PH_0$ and $PH_1$ based on a received reference clock signal (CLK). The first set of switches 350, 352, and 354 are driven using clock signal $PH_0$ and the second set of switches 356, 358, 360, 362, and 364 are driven using clock signal $PH_1$. By controlling the clock signals $PH_0$ and $PH_1$, the capacitors 366, 368, 370, and 372 may be charged by the input voltage $V_{IN}$ and the control voltage $V_C$ is based on the capacitor voltages.

While separate step-down charge pumps are shown for the gate voltage $V_G$ and the control voltage $V_C$ (FIGS. 3B and 3C, respectively), the switch-mode DC-DC converter module 140 may include both of these step-down charge pumps. However, as previously described, in some implementations a single-output charge pump may be implemented. For example, when an external gate voltage $V_{G-EXT}$ is connected, the control voltage $V_C$ step-down charge pump of FIG. 3C could be implemented.

Figure 4A:
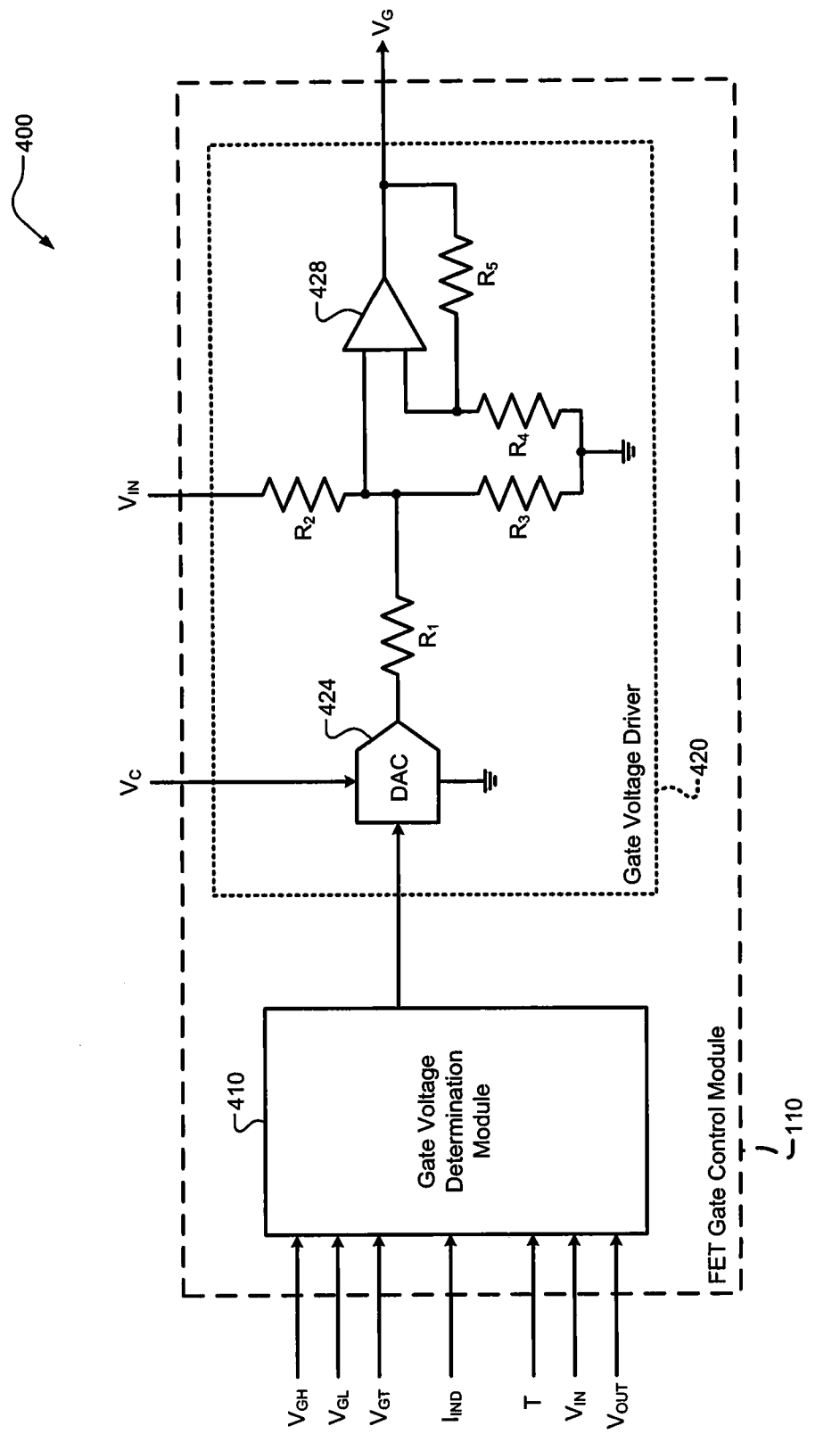
FIG. 4A is a schematic of an example control system for determining and driving gate voltage according to one implementation of the present disclosure.

Referring now to FIG. 4A, an example control system 400 for determining and driving the gate voltage $V_G$ is shown. The FET gate control module 110 may include a gate voltage determination module 410 and a gate voltage driver 420. The gate voltage determination module 410 may determine the gate voltage $V_G$ for driving the FETs 130 based on one or more of a plurality of parameters.

As shown, the gate voltage determination module 410 may receive the following parameters: (1) high gate voltage ($V_{GH}$), (2) low gate voltage ($V_{GL}$), (3) gate voltage threshold ($V_{GT}$), (4) inductor current $I_{IND}$, (5) temperature (T), (6) input voltage $V_{IN}$, and/or (7) output voltage $V_{OUT}$. The gate voltage determination module 410, however, may also receive other suitable operating parameters (e.g., environmental parameters affecting the necessary gate voltage $V_G$). The gate voltage determination module 410 may include a non-linear look-up table relating the desired gate voltage to the various parameters. For example, the non-linear look-up table may have a variable gain.

Therefore, based on the received parameters and using the non-linear look-up table, the gate voltage determination module 410 may output a desired gate voltage. For example, the gate voltage determination module 410 may output an N-bit digital signal representing the desired gate voltage. For example only, N may equal 3. However, additional bits may increase accuracy. The gate voltage driver 420 receives the desired gate voltage. A digital-to-analog converter (DAC) 424 powered by the control voltage $V_C$ converts the desired gate voltage into an analog signal and outputs the analog signal to the gate voltage driver 420. The gate voltage driver 420 further includes a plurality of resistors $R_1$, $R_2$, $R_3$, $R_4$, and $R_5$ and an operational amplifier 428. The analog signal output by the DAC 424 is driven by the operational amplifier 428 and the network of resistors $R_1$, $R_2$, $R_3$, $R_4$, and $R_5$ to drive the gate voltage $V_G$ to the desired gate voltage.

A first node of resistor $R_1$ is connected to the output of the DAC 424. A second node of resistor $R_1$ is connected to resistor $R_2$, resistor $R_3$, and a first input of the operational amplifier 428. A first node of resistor $R_2$ is connected to the input voltage $V_{IN}$. A second node of resistor $R_2$ is connected to resistor $R_1$, resistor $R_3$, and the first input of the operational amplifier 428. A first node of resistor $R_3$ is connected to resistor $R_1$, resistor $R_2$, and the first input of the operational amplifier 428. A second node of resistor $R_3$ is connected to resistor $R_4$ and ground GND. A first node of resistor $R_4$ is connected to resistor $R_5$ and a second input of the operational amplifier 428. A second node of resistor $R_4$ is connected to resistor $R_3$ and to ground GND. A first node of resistor $R_5$ is connected to resistor $R_4$ and the second input of the operational amplifier 428. A second node of resistor $R_5$ is connected to an output of the operational amplifier 428 and the gate voltage $V_G$ output.

Figure 4B:
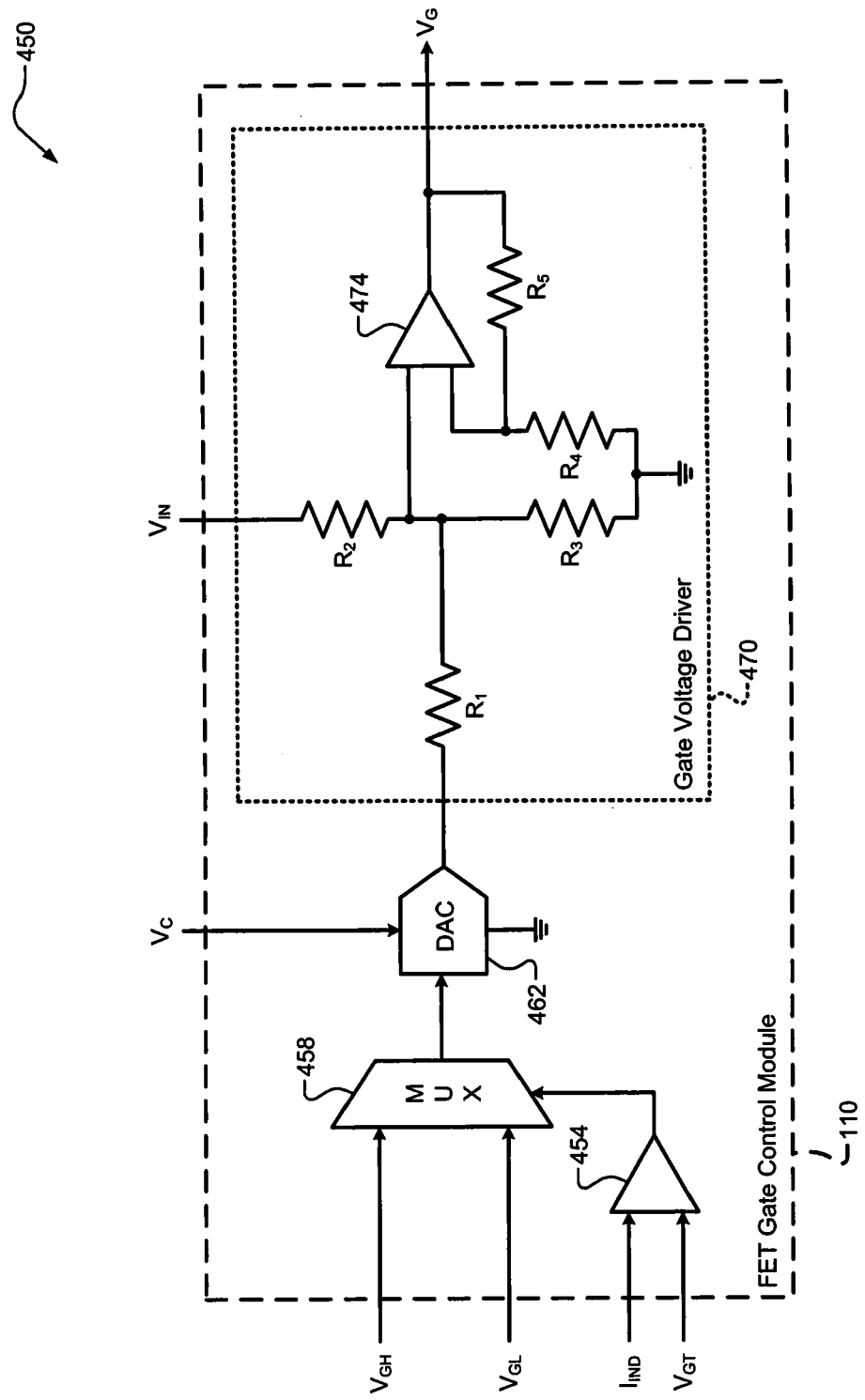
FIG. 4B is a schematic of an example control system for determining and driving gate voltage according to another implementation of the present disclosure.

Referring now to FIG. 4B, another example control system 450 for determining and driving the gate voltage $V_G$ is shown. In this control system 450, the FET gate control module 110 determines the desired gate voltage selects one of the high gate voltage $V_{GH}$ and the low gate voltage $V_{GA}$ based on inductor current $I_{IND}$ and the gate voltage threshold $V_{GT}$. Specifically, an operational amplifier 454 driven by the inductor current $I_{IND}$ and the gate voltage threshold $V_{GT}$ selects the high gate voltage $V_{GH}$ or the low gate voltage $V_{GL}$. For example, the high and low gate voltages $V_{GH}$ and $V_{GL}$, respectively, may be either predetermined or selected by a user. For example only, the high gate voltage $V_{GH}$ may be 8.5V and the low gate voltage $V_{GL}$ may be 5.0V.

A DAC 424 powered by the control voltage $V_C$ converts the desired gate voltage into an analog signal and outputs the analog signal to the gate voltage driver 470. For example, the digital signal may be N bits and therefore the DAC 462 may be an N-bit DAC. However, more bits may increase accuracy. The gate voltage driver 470 further includes a plurality of resistors $R_1$, $R_2$, $R_3$, $R_4$, and $R_5$ and an operational amplifier 474. The analog signal output by the DAC 462 is driven by the operational amplifier 474 and the network of resistors $R_1$, $R_2$, $R_3$, $R_4$, and $R_5$ to drive the gate voltage $V_G$ to the desired gate voltage.

Similar to FIG. 4B, a first node of resistor $R_1$ is connected to the output of the DAC 462. A second node of resistor $R_1$ is connected to resistor $R_2$, resistor $R_3$, and a first input of the operational amplifier 474. A first node of resistor $R_2$ is connected to the input voltage $V_{IN}$. A second node of resistor $R_2$ is connected to resistor $R_1$, resistor $R_3$, and the first input of the operational amplifier 474. A first node of resistor $R_3$ is connected to resistor $R_1$, resistor $R_2$, and the first input of the operational amplifier 474. A second node of resistor $R_3$ is connected to resistor $R_4$ and ground GND. A first node of resistor $R_4$ is connected to resistor $R_5$ and a second input of the operational amplifier 474. A second node of resistor $R_4$ is connected to resistor $R_3$ and to ground GND. A first node of resistor $R_5$ is connected to resistor $R_4$ and the second input of the operational amplifier 474. A second node of resistor $R_5$ is connected to an output of the operational amplifier 474 and the gate voltage $V_G$ output.

Figure 5:
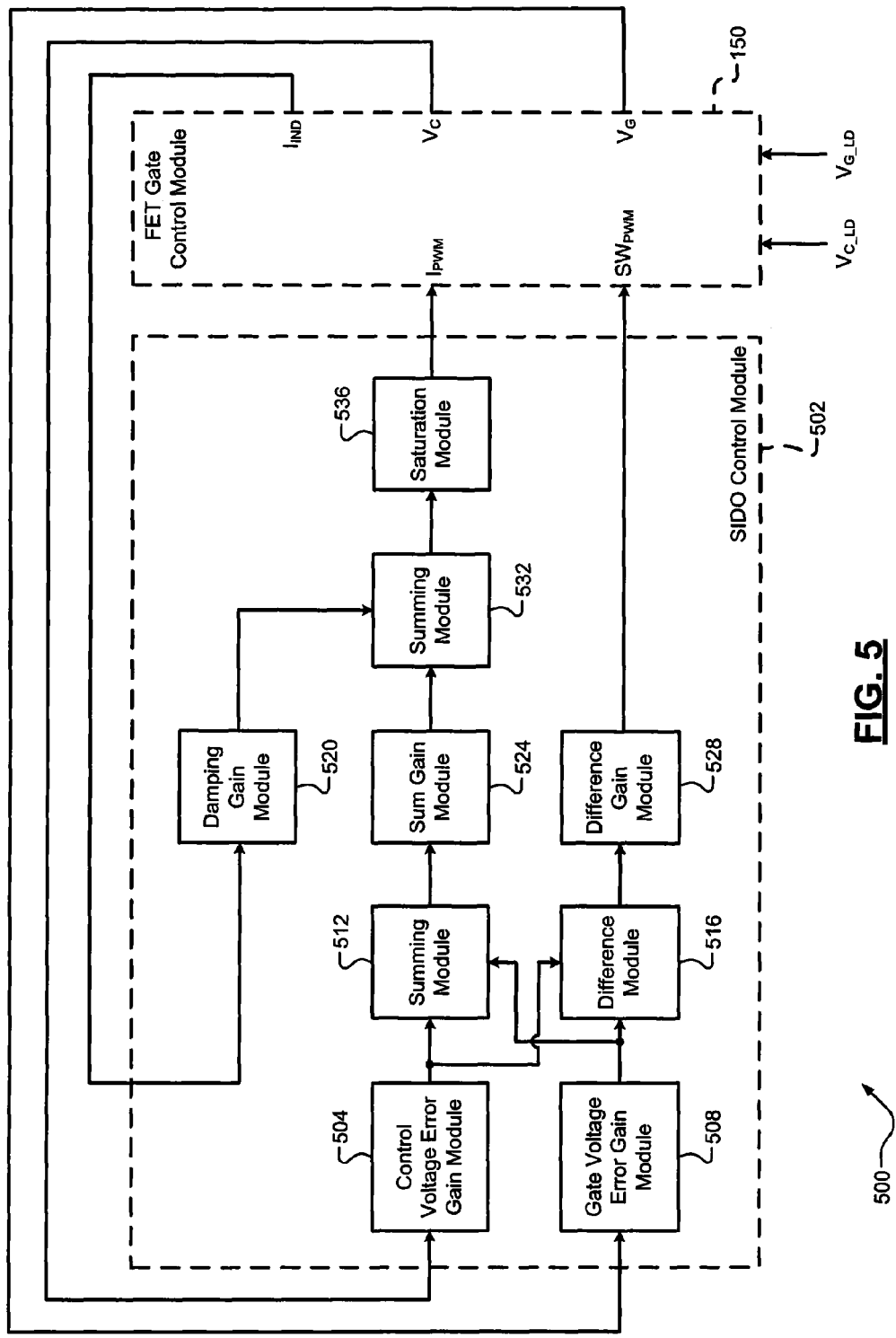
FIG. 5 is a functional block diagram of an example control system for controlling voltages generated by an SIDO voltage converter according to one implementation of the present disclosure.

Referring now to FIG. 5, an example control system 500 for controlling voltages ($V_C$ and $V_G$) generated by an SIDO voltage converter is shown. In other words, the example control system 500 may be implemented when the switch-mode DC-DC converter module 140 has an SIDO voltage converter configuration. In addition, while a separate control module 502 for the switch-mode DC-DC converter module 140 is shown, the control module 502 may be a sub-module of the switch-mode DC-DC converter module 140.

The switch-mode DC-DC control module 502 receives the control voltage $V_C$, the gate voltage $V_G$, and the inductor current $I_{IND}$ as feedback from the FET gate drive module 150. The switch-mode DC-DC control module 502 may include a control voltage error gain module 504, a gate voltage error gain module 508, a first summing module 512, a difference module 516, a damping gain module 520, a sum gain module 524, a difference gain module 528, a second summing module 532, and a saturation module 536.

The control voltage error gain module 504 generates a control voltage error $V_{CE}$ based on the control voltage $V_C$ and the reference control voltage $V_{CR}$. Similarly, the gate voltage error gain module 508 generates a gate voltage error ($V_{GE}$) based on the gate voltage $V_G$ and the reference gate voltage $V_{AR}$. The first summing module 512 calculates a sum of the control voltage error $V_{CE}$ and the gate voltage error $V_{GE}$. The difference module 516 calculates a difference between the gate voltage error $V_{GE}$ and the control voltage error $V_{CE}$.

The damping gain module 520 generates a damping signal (Damp) based on the inductor current $I_{IND}$. The sum gain module 524 applies a gain to the sum of the gate voltage error $V_{GE}$ and the control voltage error $V_{CE}$. The difference gain module 528 applies a gain to the difference between the gate voltage error $V_{GE}$ and the control voltage error $V_{CE}$. The output of the difference gain module 528 is a switch PWM signal ($SW_{PWM}$). The second summing module 532 calculates a sum of the damping signal Damp and the output of the sum gain module 524. The saturation module 536 limits the output of the second summing module 532 to a predetermined range. For example, limiting the sum to a predetermined range (i.e., saturation limits) may prevent windup. The output of the saturation module 536 is a current PWM signal ($I_{PWM}$).

The current PWM signal $I_{PWM}$, the switch PWM signal $SW_{PWM}$, and load currents for the control voltage $V_C$ and the gate voltage $V_G$ ($V_{C\_LD}$ and $V_{G\_LD}$, respectively) may be used to control the SIDO voltage converter during future cycles. For example, the current PWM signal $I_{PWM}$ may be used to control a duty cycle of switches in the SIDO voltage converter. Lastly, the control voltage load $V_{C\_LD}$ and the gate voltage load $V_{G\_LD}$ may be used to adjust the control voltage $V_C$ and the gate voltage $V_G$, respectively.

Figure 6A:
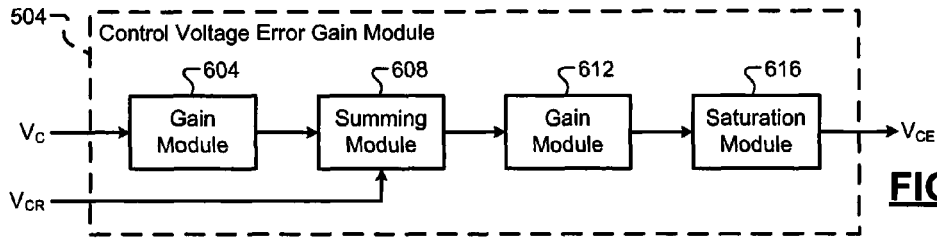
FIGS. 6A-6E are functional block diagrams of example feedback modules for controlling the voltages generated by the SIDO voltage converter according to one implementation of the present disclosure.

Referring now to FIGS. 6A-6E, feedback modules 504, 508, 520, 524, and 528 are shown in more detail. FIG. 6A illustrates an example of the control voltage error gain module 504. The control voltage error gain module 504 includes a first gain module 604, a summing module 608, a second gain module 612, and a saturation module 616. The first gain module 604 applies a first gain to the control voltage $V_C$. The summing module 608 calculates a sum of the output of the gain module 604 and the reference control voltage $V_{CR}$. For example, the reference control voltage $V_{CR}$ may be predetermined. The second gain module 612 applies a second gain to the output of the summing module 608. The saturation module 616 limits the output of the second gain module 612 to a predetermined range. The output of the saturation module 616 is the control voltage error $V_{CE}$.

Figure 6B:
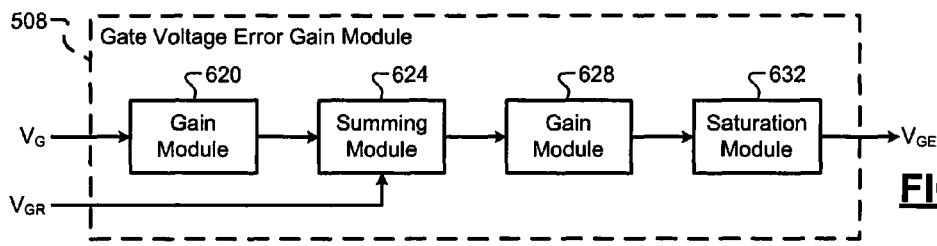

FIG. 6B illustrates an example of the gate voltage error gain module 508. The gate voltage error gain module 508 may include a first gain module 620, a summing module 624, a second gain module 628, and a saturation module 632. The first gain module 620 applies a first gain to the gate voltage $V_G$. The summing module 624 calculates a sum of the output of the first gain module 620 and a reference gate voltage ($V_{GR}$). For example, the reference gate voltage $V_{GR}$ may be predetermined. The second gain module 628 applies a second gain to the output of the summing module 624. The saturation module 632 limits the output of the second gain module 628 to a predetermined range. The output of the saturation module 632 is the gate voltage error $V_{GE}$.

Figure 6C:
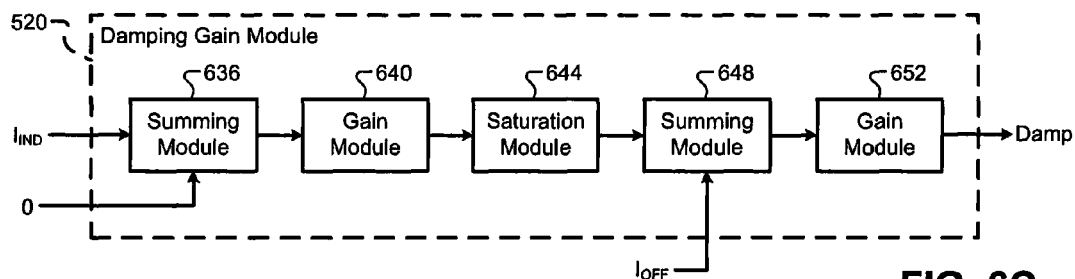

FIG. 6C illustrates an example of the damping gain module 520. The damping gain module 520 may include a first summing module 636, a first gain module 640, a saturation module 644, a second summing module 648, and a second gain module 652. The first summing module 636 calculates a sum of the inductor current $I_{IND}$ and a predetermined value. For example, the predetermined value may be zero. The first gain module 640 applies a first gain to the output of the first summing module 636. The saturation module 644 limits the output of the first gain module 640 to a predetermined range. The second summing module 648 calculates a sum of the output of the saturation module 644 and a current offset ($I_{OFF}$). For example, the current offset $I_{OFF}$ may be predetermined. The second gain module 652 applies a second gain to the output of the second summing module 648. The output of the second gain module 652 is the damping signal Damp.

Figure 6D:
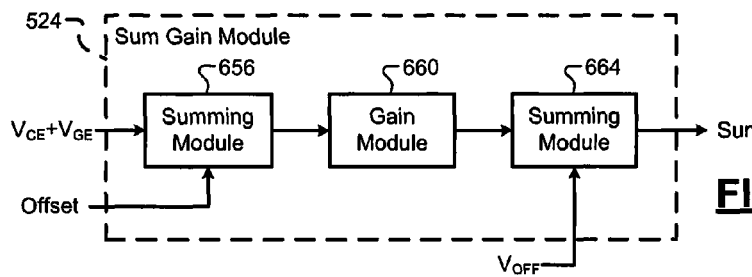

FIG. 6D illustrates an example of the sum gain module 524. The sum gain module 524 may include a first summing module 656, a gain module 660, and a second summing module 664. The first summing module 656 calculates a sum of the control voltage error $V_{CE}$, the gate voltage error $V_{GE}$, and an offset. For example, the offset may be predetermined. The gain module 660 applies a gain to the output of the first summing module 656. The second summing module 664 calculates a sum of the output of the gain module 660 and a voltage offset ($V_{OFF}$). For example, the voltage offset $V_{OFF}$ may be predetermined. The output of the second summing module 664 may be referred to as Sum.

Figure 6E:
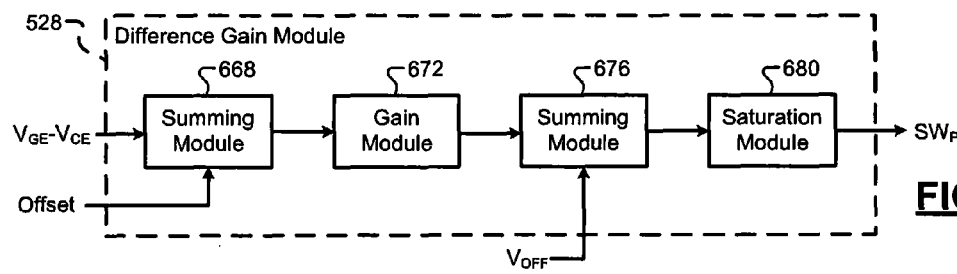

Lastly, FIG. 6E illustrates an example of the difference gain module 528. The difference gain module 528 may include a first summing module 668, a gain module 672, a second summing module 676, and a saturation module 680. The first summing module 668 calculates a sum of a difference and an offset (Offset). The difference is a difference between the gate voltage error $V_{GE}$ and the control voltage error $V_{CE}$. For example, the offset may be predetermined. The gain module 672 applies a gain to the output of the first summing module 668. The second summing module 676 calculates a sum of the output of the gain module 672 and a voltage offset ($V_{OFF}$). For example, the voltage offset $V_{OFF}$ may be the same voltage offset as FIG. 6D. However, the voltage offset $V_{OFF}$ may also be difference. For example, the voltage offset VOFF may be predetermined. The saturation module 680 limits the output of the second summing module 676 to a predetermined range. The output of the saturation module 680 may be the switch pulse width modulation signal $SW_{PWM}$.

Referring now to FIGS. 7A-7D, simulated results of the control voltage $V_C$, the gate voltage $V_G$, and the inductor current $I_{IND}$ are shown in response to various load steps. A first load step includes increasing the control voltage load $V_{C\_LD}$ by 0.05 amps (A) for a first period of approximately 400 milliseconds (ms). A second load step includes increasing the gate voltage load $VG_{\_LD}$ by 0.10 A for a second period of approximately 400 ms. Moreover, the first and second periods overlap by approximately 150 ms. Therefore, the sequence of load steps is as follows: (1) no load, (2) $V_{C\_LD}$, (3) $V_{C\_LD}$ and $V_{G\_LD}$, (4) $V_{G\_LD}$, and (5) no load. In other words, each possible combination of applied loads is illustrated. As shown, each of the control voltage $V_C$, the gate voltage $V_G$, and the inductor current $I_{IND}$ respond to the various load steps both quickly and accurately.

Figure 8:
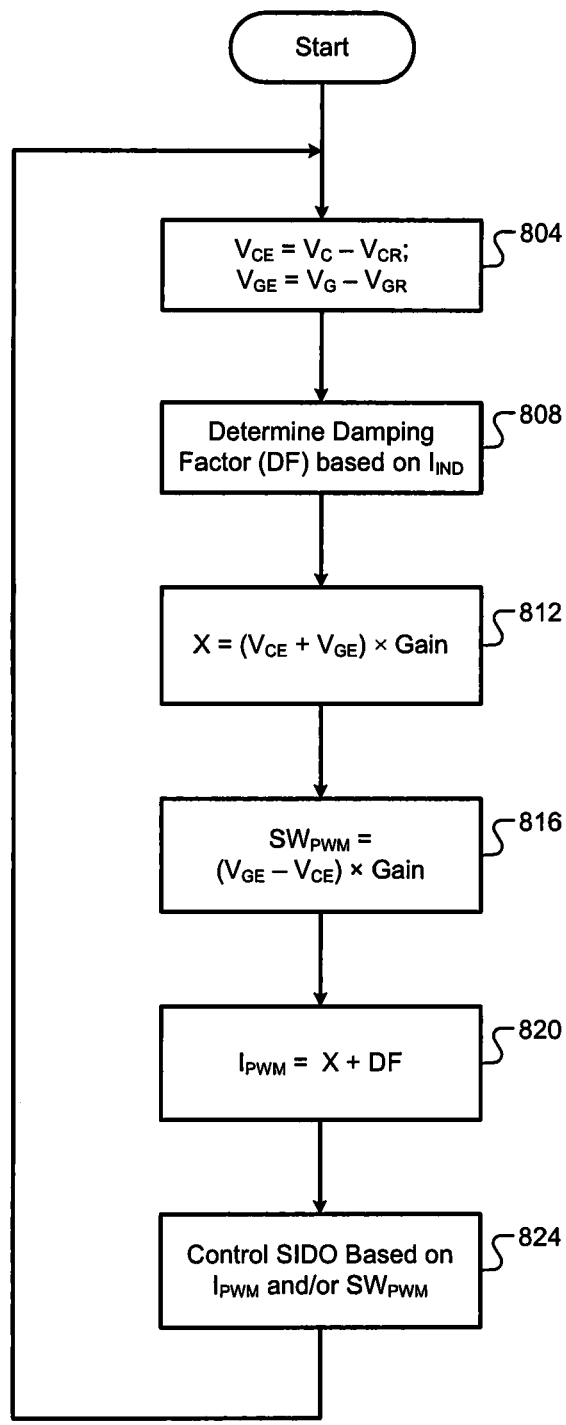
FIG. 8 is a flow diagram illustrating an example method for controlling voltages generated by an SIDO voltage converter according to one implementation of the present disclosure.

Referring now to FIG. 8, an example method for controlling voltages generated by an SIDO voltage converter begins at 804. At 804, the SIDO control module 502 determines (i) the control voltage error $V_{CE}$ based on the control voltage $V_C$ and the reference control voltage $V_{CR}$ and (ii) the gate voltage error $V_{GE}$ based on the gate voltage $V_G$ and the reference gate voltage $V_{GR}$. At 808, the SIDO control module 502 determines the damping factor (DF) based on the measured inductor current $I_{IND}$. At 812, the SIDO control module 502 determines a quantity (X) based on a product of a gain (Gain) and a sum of the control voltage error $V_{CE}$ and the gate voltage error $V_{GE}$.

At 816, the SIDO control module 502 determines the duty cycle $SW_{PWM}$ based on a product of another gain (Gain) and a difference between the gate voltage error $V_{GE}$ and the control voltage error $V_{CE}$. At 820, the SIDO control module 502 determines $I_{PWM}$ based on a sum of the quantity X and the damping factor DF. At 824, the SIDO control module 502 controls the SIDO voltage converter to adjust the control voltage VC and/or the gate voltage VG based on $SW_{PWM}$ and $I_{PWM}$. For example, $SW_{PWM}$ may represent a desired duty cycle for switches in the SIDO voltage converter. Control may then return to 802.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a power supply, the control system comprising:
a plurality of field effect transistors (FETs), wherein at least one of the FETs receives an input voltage;
a switch-mode direct-current (DC) to DC converter module that includes a single-inductor dual-output (SIDO) voltage converter, that receives the input voltage, and that generates first and second voltages;
a DC-DC control module that receives the input voltage, that generates a control signal indicating a desired duty cycle based on a desired output voltage and the input voltage, that determines a damping factor based on current flowing through the inductor of the SIDO voltage converter and that controls the first and second voltages based on the first and second voltages and the damping factor,
wherein the first voltage powers the DC-DC control module; and
a FET gate drive module that selectively drives the FETs of the power supply based on the control signal and using the second voltage thereby generating an output voltage corresponding to the desired output voltage from the input voltage.

2. The control system of claim 1, wherein the switch-mode DC-DC converter module decreases one of the first and second voltages to less than the input voltage and boosts the other of the first and second voltages to greater than the input voltage.

3. The control system of claim 1, wherein the FET gate drive module determines a desired gate voltage based on a at least one of a plurality of operating parameters using an algebraic expression or processor code and drives the second voltage to the desired gate voltage.

4. The control system of claim 3, wherein the desired gate voltage is an N-bit digital signal, wherein N is an integer greater than one, and wherein the desired gate voltage is decoded by a digital-to-analog (DAC) converter before driving the second voltage to the desired gate voltage.

5. The control system of claim 1 wherein the DC-DC control module:
calculates a first voltage error based on a difference between the first voltage and a reference first voltage; and
calculates a second voltage error based on a difference between the second voltage and a reference second voltage.

6. The control system of claim 5 wherein the DC-DC control module:
calculates a sum of the first and second voltage errors and that applies a gain to the sum;
calculates a sum of the gain-applied sum and the damping factor; and
controls the first and second voltages based on the sum of the gain-applied sum and the damping factor.

7. The control system of claim 5 wherein the DC-DC control module:
calculates a difference between the second and first voltage errors and that applies a gain to the difference; and
controls the desired duty cycle of switches in the SIDO voltage converter based on the gain-applied difference.

8. The control system of claim 1 wherein the DC-DC control module controls the first and second voltages further based on a load current for each of the first and second voltages.

9. The control system of claim 1 wherein the FET gate drive module determines a desired gate voltage based on at least one of a plurality of operating parameters using a non-linear look-up table, and drives the second voltage to the desired gate voltage.

10. The control system of claim 9, wherein the plurality of operating parameters include a high second voltage, a low second voltage, a second voltage threshold, the current flowing through the inductor of the SIDO voltage converter, power supply input voltage, power supply output voltage, and ambient temperature.

\* \* \* \* \*

UNITED STATES PATENT AND TRADEMARK OFFICE
CERTIFICATE OF CORRECTION

PATENT NO. : 8,629,663 B2  
APPLICATION NO. : 13/078283  
DATED : January 14, 2014  
INVENTOR(S) : Paul W. Latham, II Page 1 of 1

It is certified that error appears in the above-identified patent and that said Letters Patent is hereby corrected as shown below:

In the Specifications:

| | |
|---|---|
| Column 2, Line 57 | Delete "logical or" and insert --logical OR-- |
| Column 6, Line 2 | After "304,", insert --and-- |
| Column 6, Line 6 | After "304,", insert --and-- |
| Column 6, Line 17 | Delete "LE2." and insert --$L_{E2}$.-- |
| Column 7, Line 53 | Delete "$V_{G\text{-}EXT}$" and insert --$V_{G\_EXT}$-- |
| Column 8, Line 45 | Delete "$V_{GA}$" and insert --$V_{GL}$-- |
| Column 9, Line 38 | Delete "$V_{AR}$" and insert --$V_{GR}$-- |
| Column 11, Line 1 | Delete "VOFF" and insert --$V_{OFF}$-- |
| Column 11, Line 12 | Delete "$VG_{\_LD}$" and insert --$V_{G\_LD}$-- |

Signed and Sealed this  
Twenty-seventh Day of May, 2014

Michelle K. Lee  
*Deputy Director of the United States Patent and Trademark Office*